United States Patent
Banno

(10) Patent No.: US 6,946,418 B2
(45) Date of Patent: *Sep. 20, 2005

(54) DIELECTRIC CERAMIC AND CERAMIC ELECTRONIC COMPONENT

(75) Inventor: Koichi Banno, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 33 days.

This patent is subject to a terminal disclaimer.

(21) Appl. No.: 10/725,287

(22) Filed: Dec. 2, 2003

(65) Prior Publication Data

US 2004/0110626 A1 Jun. 10, 2004

(30) Foreign Application Priority Data

Dec. 3, 2002 (JP) .................................. 2002-351727
Oct. 3, 2003 (JP) .................................. 2003-345752

(51) Int. Cl.[7] .............................................. C04B 35/47
(52) U.S. Cl. ........................ 501/136; 428/210; 428/702
(58) Field of Search .......................... 501/136; 428/210, 428/702

(56) References Cited

U.S. PATENT DOCUMENTS 4,482,934 A * 11/1984 Hirota et al. ............ 361/321.5
4,746,639 A * 5/1988 Sano et al. ................. 501/136

FOREIGN PATENT DOCUMENTS

JP          03-097669          4/1991

* cited by examiner

*Primary Examiner*—Karl Group
(74) *Attorney, Agent, or Firm*—Dickstein, Shapiro, Morin & Oshinsky, LLP.

(57) ABSTRACT

A dielectric ceramic contains a primary constituent represented by general formula (1): $a[(Sr_bCa_{1-b})TiO_3]-(1-a)[Bi_2O_3 \cdot nTiO_2]$ (wherein a and b indicate molar amounts, and n indicates a molar ratio of $TiO_2$ to $Bi_2O_3$), and a secondary constituent represented by general formula (2): $xMgTiO_3 + yMnO_m + zLn_2O_3$ (wherein x, y, and z indicate weight per 100 parts by weight of the primary constituent, m is 1 to 2, and Ln is at least one of La, Ce, Pr, Nd, Sm, Eu, Gd, Dy, Ho, and Er), wherein a, b, n, x, y, and z satisfy the expressions $0.88 \leq a \leq 0.92$, $0.30 \leq b \leq 0.50$, $1.8 \leq n \leq 3.0$, $1.0 \leq x \leq 3.0$, $0.1 \leq y \leq 2.0$, and $0 < z \leq 3.0$. A ceramic electronic component including the dielectric ceramic is also disclosed.

20 Claims, 1 Drawing Sheet

DIELECTRIC CERAMIC AND CERAMIC ELECTRONIC COMPONENT

BACKGROUND OF THE INVENTION

1. Field of the Invention

The present invention relates to dielectric ceramics and ceramic electronic components. More particularly, the invention relates to dielectric ceramics with high dielectric constants and ceramic electronic components, such as single-layer capacitors, trimmer capacitors, and monolithic ceramic capacitors, including such dielectric ceramics.

2. Description of the Related Art

As the dielectric ceramic having a high dielectric constant, Japanese Unexamined Patent Application Publication No. 3-97669 discloses a dielectric ceramic containing strontium titanate ($SrTiO_3$), lead titanate ($PbTiO_3$), calcium titanate ($CaTiO_3$), bismuth titanate ($Bi_2O_3$), titanium dioxide ($TiO_2$), and tin oxide ($SnO_2$) as primary constituents.

However, the dielectric ceramic described above has a disadvantage from the view of reduction of environmental pollution because is Pb contained in the composition.

SUMMARY OF THE INVENTION

It is an object of the present invention to provide a dielectric ceramic which maintains a high dielectric constant and a high Q factor, has excellent linearity in temperature characteristics, and minimizes the rate of change in dielectric constant with temperature, even without containing Pb. It is another object of the present invention to provide a ceramic electronic component including the dielectric ceramic.

The present inventor has carried out thorough research to achieve the objects described above and has obtained the following findings. That is, by using a primary constituent comprising $(Sr.Ca)TiO_3$ and $Bi_2O_3.TiO_2$, and further a secondary constituent comprising $MgTiO_3$, $MnO_m$, and $Ln_2O_3$, and furthermore, by setting molar ratios or specific ranges, and by using, as Ln, a lanthanide selected from the group consisting of lanthanum (La), cerium (Ce), praseodymium (Pr), neodymium (Nd), samarium (Sm), europium (Eu), gadolinium (Gd), dysprosium (Dy), holmium (Ho) and erbium (Er), it is possible to obtain a dielectric constant of 300 or more and a Q factor of 1,000 or more, even if the composition does not contain Pb, and moreover, it is possible to minimize the rate of change in dielectric constant in the ordinary temperature range (−55° C. to 85° C.) (hereinafter referred to as "temperature coefficient") within −2,000 ppm/° C.

The present invention has been achieved based on the findings described above. In one aspect of the present invention, a dielectric ceramic contains a primary constituent represented by general formula (1):

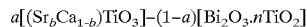

(wherein a and b indicate molar amounts, and n indicates the molar amount of $TiO_2$ relative to $Bi_2O_3$), and a secondary constituent represented by general formula (2):

(wherein x, y, and z indicate weight amounts to 100 parts by weight of the primary constituent, m is 1 to 2, and Ln is at least one element selected from the group consisting of La, Ce, Pr, Nd, Sm, Eu, Gd, Dy, Ho, and Er), wherein a, b, n, x, y and z satisfy $0.88 \leq a \leq 0.92$, $0.30 \leq b \leq 0.50$, $1.8 \leq n \leq 3.0$, $1.0 \leq x \leq 3.0$, $0.1 \leq y \leq 2.0$, and $0 < z \leq 3.0$.

As a result of further research by the present inventor, it has been found that by adding $TiO_2$ as a material for the secondary constituent so that the molar ratio of the element Ti to the element Ln is about 1.5 or less, the dielectric constant can be further improved without degrading the temperature characteristics.

Accordingly, the secondary constituent further preferably contains $TiO_2$ in the dielectric ceramic of the present invention, and the $TiO_2$ content is determined to satisfy the expression $0 < p \leq 1.5$, wherein p is the molar ratio of the element Ti to the element Ln in the secondary constituent.

As a result of still further research by the present inventor, it has been found that by adding silicon dioxide ($SiO_2$) as a material for the secondary constituent at a weight ratio of about 1 or less to 100 parts by weight of the primary constituent, the firing temperature can be decreased without degrading the dielectric characteristics, and the mechanical strength can also be further improved.

Accordingly, the secondary constituent preferably further contains $SiO_2$ in the dielectric ceramic of the present invention, and the $SiO_2$ content is determined to satisfy the expression $0 < w \leq 1$ is satisfied, wherein w is the weight ratio of $SiO_2$ to 100 parts by weight of the primary constituent.

In another aspect of the present invention, a ceramic electronic component of the present invention includes a dielectric object made of the dielectric ceramic and electrodes disposed on the surfaces of the object.

The dielectric ceramic of the present invention contains the primary constituent and the secondary constituent, and a, b, n, x, y, and z in general formulae (1) and (2) satisfy $0.88 \leq a \leq 0.92$, $0.30 \leq b \leq 0.50$, $1.8 \leq n \leq 3.0$, $1.0 \leq x \leq 3.0$, $0.1 \leq y \leq 2.0$, and $0 < z \leq 3.0$. Consequently, even without containing Pb, the dielectric ceramic has a high dielectric constant, a high Q factor, excellent linearity in temperature characteristics, and a low rate of change in dielectric constant with temperature, and has strength sufficient for practical use.

By adding $TiO_2$ as a material for the secondary constituent so that the molar ratio p of the element Ti to the element Ln in the secondary constituent satisfies the expression $0 < p \leq 1.5$, it is possible to further improve the dielectric constant without degrading the temperature characteristics.

By adding $SiO_2$ as a material for the secondary constituent so that the weight ratio w of $SiO_2$ to 100 parts by weight of the primary constituent satisfies the expression $0 < w \leq 1$, the firing temperature can be decreased, and moreover, the flexural strength can be further improved.

In the ceramic dielectric, the dielectric constant is 300 or more, the Q factor is 1,000 or more, and the temperature coefficient can be decreased to within −2,000 ppm/° C. Consequently, even if the dielectric ceramic object, i.e., the ceramic sintered compact, does not contain Pb, it is possible to easily fabricate ceramic electronic components, such as various ceramic capacitors, which have high quality, high dielectric constants, satisfactory temperature characteristics, and excellent mechanical strength.

DESCRIPTION OF THE PREFERRED EMBODIMENTS

Figure 1:
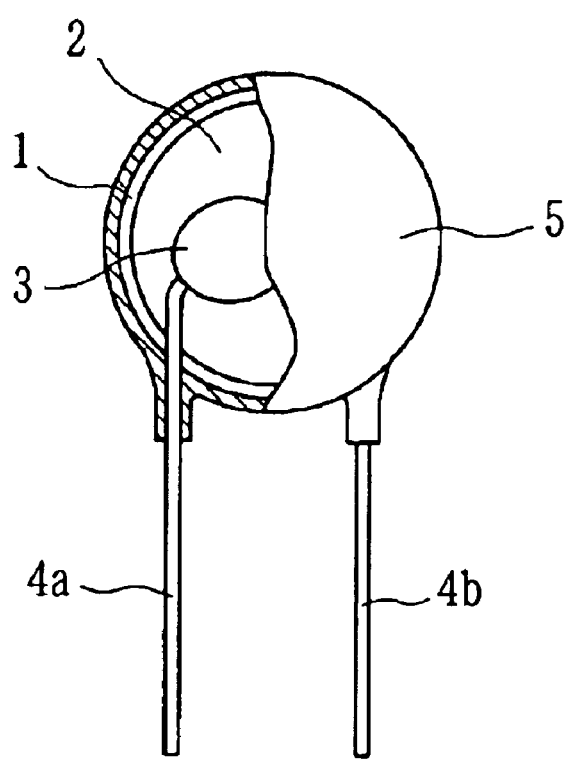
FIG. 1 is a front view with a cutaway section of a single-layer capacitor which is a ceramic electronic component fabricated using a dielectric ceramic of the present invention.

The preferred embodiments of the present invention will now be described below.

FIG. 1 is a front view with a cutaway section of a single-layer capacitor which is a ceramic electronic component fabricated using a dielectric ceramic of the present invention.

The single-layer capacitor includes a ceramic sintered compact 1, electrodes 2 disposed on the surfaces of the ceramic sintered compact 1, a pair of leads 4a and 4b electrically connected to the electrodes 2 with solder joints 3 therebetween, and an outer coating 5 composed of a resin.

In this embodiment, the dielectric ceramic constituting the ceramic sintered compact 1 contains a primary constituent represented by the following general formula (1) and a secondary constituent represented by the following general formula (2).

$$a[(Sr_bCa_{1-b})TiO_3]-(1-a)[Bi_2O_3 \cdot nTiO_2] \quad (1)$$

$$xMgTiO_3-yMnO_m-zLn_2O_3 \quad (2)$$

In general formula (1), a indicates the molar amount of $(Sr_bCa_{1-b})TiO_3$, b indicates the molar amount of Sr, and n indicates the molar ratio of $TiO_2$ to $Bi_2O_3$. In general formula (2), x, y and z indicate the weight ratios to 100 parts by weight of the primary constituent, m is 1 to 2, and Ln is at least one element selected from the group consisting of La, Ce, Pr, Nd, Sm, Eu, Gd, Dy, Ho and Er.

The dielectric ceramic composition (starting material composition) in the dielectric ceramic, is appropriately prepared so that a, b, n, x, y and z satisfy the following expressions (3) to (8), respectively.

$$0.88 \leq a \leq 0.92 \quad (3)$$

$$0.30 \leq b \leq 0.50 \quad (4)$$

$$1.8 \leq n \leq 3.0 \quad (5)$$

$$1.0 \leq x \leq 3.0 \quad (6)$$

$$0.1 \leq y \leq 2.0 \quad (7)$$

$$0 < z \leq 3.0 \quad (8)$$

When the dielectric ceramic has such a composition, it is possible to easily fabricate a single-layer capacitor in which a high dielectric constant of 300 or more and a Q factor of 1,000 or more are maintained, and the temperature coefficient based on the capacitance at 20° C. in the temperature range of −55° C. to 85° C. can be decreased to within −2,000 ppm/° C., which has excellent linearity in temperature characteristics, and moreover which has mechanical strength sufficient for practical use.

The reasons for the limitations will be described in detail below.

(1) Molar Amount a

If the molar amount a of $(Sr_bCa_{1-b})TiO_3$ is less than 0.88, the molar amount (1−a) of $Bi_2O_3 \cdot nTiO_2$ exceeds 0.12. In such a case, the Q factor is less than 1,000 since the molar quantity of $Bi_2O_3$ is excessive, and hence it is not possible to obtain a dielectric ceramic composition with a high Q factor. On the other hand, if the molar amount a exceeds 0.92, the molar quantity of $Bi_2O_3 \cdot nTiO_2$ is less than 0.08, and the temperature coefficient negatively deviates from −2,000 ppm/° C., thus degrading the temperature characteristics.

Therefore, the composition is prepared in this embodiment so that the molar amount a satisfies the expression $0.88 \leq a \leq 0.92$.

(2) Molar Amount b

If the molar amount b of Sr is less than 0.30, the molar quantity of $CaTiO_3$ becomes excessive. Consequently, the dielectric constant decreases to less than 300, and hence it is not possible to obtain a dielectric ceramic with a high dielectric constant. On the other hand, if the molar ratio b exceeds 0.50, since the molar quantity of $SrTiO_3$ becomes excessive, the Q factor decreases to less than 1,000, and hence it is not possible to obtain a dielectric ceramic with a high Q factor.

Therefore, the composition in this embodiment is prepared so that the molar ratio b satisfies the expression $0.30 \leq b \leq 0.50$.

(3) Molar Ratio n

If the molar ratio n of $TiO_2$ to $Bi_2O_3$ is less than 1.8, the molar content of $TiO_2$ becomes excessively low. Consequently, the dielectric constant decreases to less than 300, and hence it is not possible to obtain a dielectric ceramic with a high dielectric constant. On the other hand, if the molar ratio n exceeds 3.0, the molar quantity of $TiO_2$ increases excessively. Consequently, the Q factor decreases to less than 1,000, and hence it is not possible to obtain a dielectric ceramic with a high Q factor.

Therefore, the composition in this embodiment is prepared so that the molar ratio n satisfies the expression $1.8 \leq n \leq 3.0$.

(4) Weight Ratio x

If the weight x of $MgTiO_3$ to 100 parts by weight of the primary constituent represented by general formula (1) is less than 1.0, the temperature coefficient negatively deviates from −2,000 ppm/° C., thus degrading the temperature characteristics. On the other hand, if the weight ratio x exceeds 3.0, the dielectric constant decreases to less than 300, and hence it is not possible to obtain a dielectric ceramic with a high dielectric constant.

Therefore, the composition is prepared in this embodiment so that the weight x satisfies the expression $1.0 \leq x \leq 3.0$.

(5) Weight y

If the weight y of $MnO_m$ (wherein m is 1 to 2) to 100 parts by weight of the primary constituent represented by general formula (1) is less than 0.1, the temperature coefficient negatively deviates from −2,000 ppm/° C., thus degrading the temperature characteristics. On the other hand, if the weight y exceeds 2.0, the dielectric constant decreases to less than 300, and hence it is not possible to obtain a dielectric ceramic with a high dielectric constant.

Therefore, the composition in this embodiment is prepared so that the weight ratio y satisfies the expression $0.1 \leq y \leq 2.0$.

(6) Weight Ratio z

By adding $Ln_2O_3$, as a material for the secondary constituent, to the primary constituent represented by general formula (1), the temperature characteristics and the flexural strength can be improved. If the weight z to 100 parts by weight of the principal constituent exceeds 3.0, the dielectric constant decreases to less than 300, and hence it is not possible to obtain a dielectric ceramic with a high dielectric constant.

Therefore, the composition is prepared in this embodiment so that the weight ratio z satisfies the expression $0 < z \leq 3.0$.

(7) Ln

By limiting Ln to specific elements selected from La, Ce, Pr, Nd, Sm, Eu, Gd, Dy, Ho and Er in the lanthanoide series, and by adding the specific elements in the form of $Ln_2O_3$ so that the weight z to 100 parts by weight of the principal constituent satisfies the expression $0 < z \leq 3.0$, it is possible to obtain a dielectric ceramic with excellent dielectric characteristics in which the dielectric constant is 300 or more, the Q factor is 1,000 or more, and the temperature coefficient can be minimized to within −2,000 ppm/° C., and moreover, with excellent mechanical strength in which the flexural strength is 130 MPa or more.

When an element other than the specific elements described above, for example, Yb or Y, is added, at least one of the dielectric constant and the Q factor is decreased, and it is not possible to obtain a dielectric ceramic having a desired high dielectric constant and high quality factor.

Therefore, the specific lanthanide is added in this embodiment, as a material for the secondary constituent, to the dielectric ceramic.

Next, a method for fabricating the single-layer capacitor will be described.

First, the dielectric ceramic is prepared.

That is, $SrCO_3$, $CaCO_3$, $Bi_2O_3$, $TiO_2$, $MgTiO_3$, $MnCO_3$ and $Ln_2O_3$ (wherein Ln is at least one element selected from the group consisting of La, Ce, Pr, Nd, Sm, Eu, Gd, Dy, Ho and Er) are weighed so that the primary constituent and the secondary constituent represented by general formulae (1) and (2) satisfy the expressions (3) to (8), and the weighed materials are mixed. The resultant mixture is placed into a pot together with grinding media, such as zirconia, and wet mixing and pulverization are performed for a predetermined period of time. The pulverized mixture is subjected to evaporation drying and then placed in a sagger composed of zirconia, and calcination is performed at 900 to 1,000° C. for about 2 hours. A raw dielectric ceramic powder is thereby prepared.

Next, the raw dielectric ceramic powder together with a binder, such as polyvinyl alcohol, is placed into a pot, and wet mixing is performed for a predetermined period of time. The resultant mixture is dehydrated and dried, and particle size regulation is performed. The mixture is formed into a predetermined disk by application of pressure to prepare a ceramic green compact. The ceramic green compact is then fired at 1,180 to 1,280° C. for 2 hours to produce a dielectric ceramic, i.e., a ceramic sintered compact 1.

A conductive paste containing Ag or the like as a primary constituent is applied to both surfaces of the dielectric ceramic sintered compact 1, followed by baking to form electrodes 2.

The electrodes 2 and leads 4a and 4b are connected to each other with solder joints 3 therebetween, and an outer coating 5 is formed by resin molding. A single-layer capacitor is thereby fabricated.

Since the primary constituent and the secondary constituent represented by general formulae (1) and (2) in the dielectric ceramic in this embodiment satisfy the expressions (3) to (8), it is possible to easily fabricate a Pb-free single-layer capacitor which has a high dielectric constant, a high quality factor, and excellent temperature characteristics, and which has strength sufficient for practical use.

It is to be understood that the present invention is not limited to the embodiment described above.

For example, it is possible to improve the dielectric constant by approximately 5% to 10% without degrading the temperature characteristics by incorporating $TiO_2$ into the secondary constituent.

However, the $TiO_2$ content must be adjusted so that the molar ratio p of the element Ti to the element Ln (=Ti/Ln) is about 1.5 or less. The reason for this is that there is a possibility that the dielectric constant may be decreased if the molar ratio p exceeds about 1.5.

Preferably, a secondary constituent represented by the following general formula (9), instead of general formula (2), together with the primary constituent is incorporated into the dielectric ceramic.

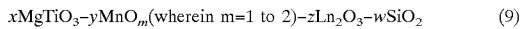

$$xMgTiO_3-yMnO_m(\text{wherein } m=1 \text{ to } 2)-zLn_2O_3-wSiO_2 \qquad (9)$$

Herein, w is the weight of $SiO_2$ to 100 parts by weight of the primary constituent, and the expression $0<w\leq 1.0$ is satisfied.

By incorporating $SiO_2$ so that the weight w is about 1 or less, it is possible to decrease the firing temperature without adversely affecting the dielectric characteristics since $SiO_2$ functions as a sintering aid.

Moreover, by incorporating $SiO_2$ at a weight w of about 1 or less as a material for the secondary constituent into the dielectric ceramic, the mechanical strength can be further improved. Such an improvement in mechanical strength is particularly useful for trimmer capacitors. When a trimmer capacitor is fabricated, the surface of the dielectric unit is polished to decrease the thickness, and then assembly is performed by mechanical caulking. In such a case, defects, such as cracks and chips, easily occur if the mechanical strength, i.e., flexural strength, of the dielectric unit is low. Therefore, preferably, the flexural strength is improved in the range in which the dielectric characteristics, etc., are not impaired.

From such a viewpoint, $SiO_2$ is preferably incorporated into the dielectric ceramic as a material for the secondary constituent at a weight w of about 1 or less, and by incorporating $SiO_2$, the flexural strength can be further improved, and a ceramic electronic component with excellent strength can be fabricated.

In the embodiment described above, carbonates, such as $SrCO_3$ and $CaCO_3$, and $TiO_2$ are used as materials for the primary constituent. Titanate compounds, such as $SrTiO_3$ and $CaTiO_3$, may also be used as materials for the primary constituent to form the dielectric ceramic.

Additionally, the same advantageous effects as those in the embodiment described above are obtained with respect to other various types of ceramic electronic components, such as monolithic ceramic capacitors.

The present invention will now be described based on the specific examples.

EXAMPLE 1

In each of Samples 1 to 26, as materials for the primary constituent, $SrCO_3$, $CaCO_3$, $Bi_2O_3$, and $TiO_2$ were first weighed so that a was 0.87 to 0.93, b was 0.25 to 0.55, and n was 1.50 to 3.20. Furthermore, $MgTiO_3$, $MnCO_3$, and $La_2O_3$ as materials for the secondary constituent, were weighed so that x was 0.50 to 5.00, y was 0.00 to 3.00, and z was 0.00 to 4.00. The materials for the primary constituent and the materials for the secondary constituent were mixed. The resultant mixture was placed into a polyethylene pot together with zirconia balls (grinding media), and wet mixing and pulverization were performed for 16 hours. The pulverized mixture was subjected to evaporation drying and then placed in a sagger composed of zirconia, and calcination was performed at 950° C. for 2 hours. A calcine (i.e., raw dielectric ceramic powder) was thereby prepared.

Next, the calcine together with polyvinyl alcohol (binder) was placed into a polyethylene pot, and wet mixing was performed for 16 hours to prepare a mixture.

The mixture was dehydrated and dried, and particle size regulation was performed. The mixture was formed into a disk with a diameter of 12 mm and a thickness of 1.2 mm by application of pressure to prepare a ceramic green compact. The ceramic green compact was then fired at 1,230 to 1,260° C. for 2 hours to produce a ceramic sintered compact (i.e., dielectric ceramic). Next, an Ag paste was applied to both surfaces of the ceramic sintered compact, followed by baking to form electrodes. Single-layer capacitors of Samples 1 to 26 were thereby fabricated.

Table 1 shows the compositions for the individual samples.

TABLE 1

| Sample | $a(Sr_bCa_{1-b})TiO_3 -$ $(1-a)[Bi_2O_3 \cdot nTiO_2]$ | | | $xMgTiO_3 + yMnO_m + zLa_2O_3$ | | |
|---|---|---|---|---|---|---|
| | a | b | n | x | y | z |
| 1* | 0.87 | 0.45 | 2.00 | 1.00 | 0.20 | 1.50 |
| 2 | 0.90 | 0.45 | 2.00 | 2.00 | 0.20 | 2.00 |
| 3* | 0.93 | 0.45 | 2.00 | 2.00 | 1.00 | 3.00 |
| 4* | 0.91 | 0.25 | 2.00 | 1.50 | 0.80 | 1.00 |
| 5 | 0.88 | 0.35 | 2.00 | 2.00 | 1.50 | 3.00 |
| 6 | 0.92 | 0.50 | 2.00 | 2.50 | 0.50 | 1.50 |
| 7 | 0.89 | 0.40 | 3.00 | 1.00 | 0.20 | 2.00 |
| 8* | 0.90 | 0.55 | 2.00 | 1.00 | 0.80 | 2.50 |
| 9* | 0.92 | 0.45 | 1.50 | 2.00 | 1.20 | 1.00 |
| 10 | 0.92 | 0.30 | 1.80 | 1.50 | 0.30 | 2.00 |
| 11 | 0.88 | 0.50 | 2.00 | 2.50 | 1.80 | 2.00 |
| 12 | 0.90 | 0.40 | 2.50 | 1.00 | 2.00 | 3.00 |
| 13 | 0.91 | 0.45 | 3.00 | 2.00 | 0.30 | 1.00 |
| 14* | 0.92 | 0.40 | 3.20 | 2.00 | 0.50 | 2.50 |
| 15* | 0.92 | 0.40 | 2.25 | 0.50 | 1.00 | 1.50 |
| 16 | 0.90 | 0.35 | 2.00 | 2.00 | 0.20 | 2.00 |
| 17* | 0.89 | 0.45 | 2.00 | 4.00 | 0.50 | 1.00 |
| 18* | 0.92 | 0.40 | 2.00 | 5.00 | 0.30 | 1.00 |
| 19* | 0.92 | 0.35 | 3.00 | 1.50 | 0.00 | 2.00 |
| 20 | 0.91 | 0.50 | 3.00 | 2.50 | 0.20 | 1.50 |
| 21* | 0.90 | 0.45 | 2.00 | 1.00 | 2.10 | 3.00 |
| 22* | 0.92 | 0.35 | 2.00 | 1.50 | 3.00 | 1.00 |
| 23* | 0.91 | 0.30 | 2.00 | 2.00 | 0.30 | 0.00 |
| 24 | 0.92 | 0.45 | 2.00 | 2.00 | 0.80 | 0.10 |
| 25 | 0.92 | 0.40 | 3.00 | 2.50 | 1.50 | 0.50 |
| 26* | 0.89 | 0.45 | 2.00 | 2.00 | 0.20 | 4.00 |

*Out of the ranges of the present invention

Next, the dielectric constant $\epsilon$ and the Q factor were measured at a temperature of 20° C., a frequency of 1 MHz and a voltage of 1 V with respect to the single-layer capacitor of each of Samples 1 to 26. The rate of change in dielectric constant $\epsilon$ based on the capacitance at 20° C. in the temperature range of −55° C. to 85° C. was measured, and the maximum rate of change was calculated as the temperature coefficient.

With respect to each of Samples 1 to 26, a ceramic plate (25 mm by 6 mm; 1 mm thick) was obtained by firing. The ceramic plate was placed on two supports 20 mm apart, and a load was applied at the center at a rate of 0.5 mm/sec to measure the flexural strength, and the mechanical strength was thereby evaluated.

Table 2 shows the results thereof.

TABLE 2

| Sample | Dielectric constant $\epsilon$ (−) | Q factor (−) | Temperature coefficient (ppm/° C.) | Firing Temperature (° C.) | Flexural strength (MPa) |
|---|---|---|---|---|---|
| 1* | 380 | 500 | −1100 | 1230 | 150 |
| 2 | 360 | 1050 | −1400 | 1240 | 140 |
| 3* | 330 | 2320 | −2400 | 1250 | 130 |
| 4* | 280 | 3500 | −1350 | 1240 | 150 |
| 5 | 350 | 1500 | −1200 | 1230 | 150 |
| 6 | 330 | 1200 | −1850 | 1250 | 140 |
| 7 | 360 | 1300 | −1400 | 1230 | 140 |
| 8* | 380 | 850 | −1800 | 1240 | 140 |
| 9* | 260 | 1500 | −1900 | 1260 | 140 |
| 10 | 310 | 3000 | −1850 | 1250 | 150 |
| 11 | 380 | 1050 | −1200 | 1230 | 140 |
| 12 | 360 | 1800 | −1500 | 1240 | 140 |
| 13 | 350 | 1800 | −1700 | 1240 | 130 |
| 14* | 320 | 900 | −1800 | 1250 | 140 |
| 15* | 310 | 1500 | −2200 | 1260 | 140 |
| 16 | 320 | 2500 | −1400 | 1240 | 140 |
| 17* | 290 | 1500 | −1350 | 1240 | 140 |
| 18* | 250 | 1200 | −1600 | 1250 | 140 |
| 19* | 310 | 3500 | −2100 | 1240 | 150 |
| 20 | 330 | 1200 | −1900 | 1250 | 140 |
| 21* | 290 | 1100 | −1800 | 1240 | 140 |
| 22* | 230 | 4000 | −1200 | 1250 | 140 |
| 23* | 300 | 3300 | −2100 | 1240 | 130 |
| 24 | 350 | 1100 | −1600 | 1240 | 140 |
| 25 | 310 | 1100 | −1700 | 1240 | 140 |
| 26* | 285 | 1100 | −1200 | 1230 | 140 |

*Out of the ranges of the present invention

As is evident from Tables 1 and 2, since a is too small with respect to Sample 1 at 0.87, the Q factor is small at 500. With respect to Sample 3, a is too large at 0.93, and the temperature coefficient is −2,400 ppm/° C. with a large negative deviation, and thus temperature characteristics are degraded.

With respect to Sample 4, since b is too small at 0.25, the dielectric constant is small at 280. With respect to Sample 8, since b is too large at 0.55, the Q factor is small at 850.

With respect to Sample 9, since n is too small at 1.50, the dielectric constant is small at 260. With respect to Sample 14, since n is too large at 3.20, the Q factor is small at 900.

With respect to Sample 15, since x is too small at 0.50, the temperature coefficient is −2,200 ppm/° C. with a large negative deviation, and thus temperature characteristics are degraded. With respect to Samples 17 and 18, since the x values are too large at 4.00 and 5.00, the dielectric constants are low at 290 and 250, respectively.

With respect to Sample 19, the temperature coefficient is −2,100 ppm/° C. with a large negative deviation since $MnO_m$ is not incorporated in the secondary constituent, and thus temperature characteristics are degraded. With respect to Samples 21 and 22, since the y amounts are too large at 2.10 and 3.00, the dielectric constants are low at 290 and 230, respectively.

With respect to Sample 23, the temperature coefficient is −2,100 ppm/° C. with a large negative deviation since $La_2O_3$ is not incorporated in the secondary constituent, and thus temperature characteristics are degraded. With respect to Sample 26, since z is too large at 4.00, the dielectric constant is low at 285.

In contrast, as seen with respect to each of Samples 2, 5 to 7, 10 to 13, 16, 20, 24, and 25, since all of the molar values a, b and n, and the weight values x, y and z are set so as to be in the ranges of the present invention, the dielectric constant is 300 or more, the Q factor is 1,000 or more, and moreover, the temperature coefficient is decreased to within −2,000 ppm/° C., and thus temperature characteristics with excellent linearity is exhibited.

Moreover, the flexural strength is 130 MPa or more, and thus the mechanical strength is sufficient for practical use.

EXAMPLE 2

The materials for the primary constituent and the materials for the secondary constituent were selected as in Sample 2 (shown in Table 1), and $TiO_2$ was weighed so that the molar ratio p of the element Ti to the element La (=Ti/La) was 0.5 to 1.8, and a single-layer capacitor for each of Samples 31 to 34 was fabricated as in EXAMPLE 1.

TABLE 3

| Sample | $a(Sr_bCa_{1-b})TiO_3 -$ $(1-a)[Bi_2O_3 . nTiO_2]$ | | | $xMgTiO_3 + yMnO_m + zLa_2O_3$ | | | |
|---|---|---|---|---|---|---|---|
| | a | b | n | x | y | z | p |
| 31 | 0.90 | 0.45 | 2.00 | 2.00 | 0.20 | 2.00 | 0.50 |
| 32 | 0.90 | 0.45 | 2.00 | 2.00 | 0.20 | 2.00 | 1.00 |
| 33 | 0.90 | 0.45 | 2.00 | 2.00 | 0.20 | 2.00 | 1.50 |
| 34 | 0.90 | 0.45 | 2.00 | 2.00 | 0.20 | 2.00 | 1.80 |

Next, the dielectric constant, the Q factor, the temperature coefficient, and the flexural strength were measured as in EXAMPLE 1 with respect to the single-layer capacitor of each of Samples 31 to 34.

Table 4 shows the results thereof.

TABLE 4

| Sample | Dielectric constant ∈ (-) | Q factor (-) | Temperature coefficient (ppm/° C.) | Firing Temperature (° C.) | Flexural strength (MPa) |
|---|---|---|---|---|---|
| 31 | 365 | 1200 | -1400 | 1240 | 140 |
| 32 | 380 | 1000 | -1400 | 1240 | 140 |
| 33 | 360 | 1100 | -1350 | 1240 | 140 |
| 34 | 350 | 1300 | -1350 | 1240 | 130 |

As is evident from Tables 3 and 4, $TiO_2$ is incorporated so that the molar ratio p is 0.50 in Sample 31, and $TiO_2$ is incorporated so that the molar ratio p is 1.00 in Sample 32. Consequently, the dielectric constants are improved to 365 and 380, respectively, compared to Sample 2 (dielectric constant: 360) in which $TiO_2$ is not incorporated.

In Sample 33, $TiO_2$ is incorporated so that the molar ratio p is 1.50, and the dielectric constant was the same as that of Sample 2.

Although $TiO_2$ is added as a material for the secondary constituent with respect to Sample 34, since the molar ratio p is large at 1.80 and the molar quantity of $TiO_2$ is too large, the dielectric constant is 350, which is lower than the dielectric constant in Sample 2 in which $TiO_2$ is not added.

As is evident from the results described above, adding $TiO_2$ so that the molar ratio p satisfies the expression $0<p\leq 1.5$ results in an improvement in dielectric constant compared to a case in which $TiO_2$ is not added.

EXAMPLE 3

Various single-layer capacitors were fabricated with different additive elements in $Ln_2O_3$ in general formula (2), n, and p, and various characteristics were evaluated as in EXAMPLE 1.

That is, as materials for the primary constituent, $SrCO_3$, $CaCO_3$, $Bi_2O_3$, and $TiO_2$ were weighed so that a was 0.92, b was 0.50, and n was 2.00. Furthermore, as materials for the secondary constituent, $MgTiO_3$, $MnCO_3$, and $Ln_2O_3$ (wherein Ln was Ce, Pr, Nd, Sm, Eu, Gd, Dy, Ho or Er) were weighed so that the weight x was 2.00, the weight y was 0.20, and the weight z was 2.00. Each of Samples 41 to 49 was prepared as in Example 1. Additionally, ceramic sintered compacts were obtained at a firing temperature of 1,250° C. in Samples 41 to 49.

In addition to the materials for the primary constituent and the materials for secondary constituent described above (wherein Ln was Ce, Gd, or Er), $TiO_2$, as a material for the secondary constituent, was weighed so that the molar ratio p of the element Ti to the element Ln (=Ti/Ln) was 1.00, and each of Samples 50 to 52 was prepared as in EXAMPLE 1. Additionally, ceramic sintered compacts were obtained at a firing temperature of 1,240° C. in Samples 50 to 52.

A single-layer capacitor of Sample 53 was fabricated as in Samples 41 to 49 except that ytterbium (Yb) was used as Ln. A single-layer capacitor of Sample 54 was also fabricated as in Samples 41 to 49 except that yttrium (Y) was used as Ln.

Furthermore, single-layer capacitors of Samples 55 to 63 were fabricated as in Samples 41 to 49 by using the lanthanides of the present invention as Ln and by setting z at 4.00. Additionally, in Samples 55 to 63, ceramic sintered compacts were obtained at firing temperatures of 1,220 to 1,250° C.

Table 5 shows the compositions for Samples 41 to 63.

TABLE 5

| Sample | $a(Sr_bCa_{1-b})TiO_3 -$ $(1-a)[Bi_2O_3 . nTiO_2]$ | | | $xMgTiO_3 + yMnO_m + zLn_2O_3$ | | | | |
|---|---|---|---|---|---|---|---|---|
| | a | b | n | x | y | z | Ln | p |
| 41 | 0.92 | 0.50 | 2.00 | 2.00 | 0.20 | 2.00 | Ce | 0.00 |
| 42 | 0.92 | 0.50 | 2.00 | 2.00 | 0.20 | 2.00 | Pr | 0.00 |
| 43 | 0.92 | 0.50 | 2.00 | 2.00 | 0.20 | 2.00 | Nd | 0.00 |
| 44 | 0.92 | 0.50 | 2.00 | 2.00 | 0.20 | 2.00 | Sm | 0.00 |
| 45 | 0.92 | 0.50 | 2.00 | 2.00 | 0.20 | 2.00 | Eu | 0.00 |
| 46 | 0.92 | 0.50 | 2.00 | 2.00 | 0.20 | 2.00 | Gd | 0.00 |
| 47 | 0.92 | 0.50 | 2.00 | 2.00 | 0.20 | 2.00 | Dy | 0.00 |
| 48 | 0.92 | 0.50 | 2.00 | 2.00 | 0.20 | 2.00 | Ho | 0.00 |
| 49 | 0.92 | 0.50 | 2.00 | 2.00 | 0.20 | 2.00 | Er | 0.00 |
| 50 | 0.92 | 0.50 | 2.00 | 2.00 | 0.20 | 2.00 | Ce | 1.00 |
| 51 | 0.92 | 0.50 | 2.00 | 2.00 | 0.20 | 2.00 | Gd | 1.00 |
| 52 | 0.92 | 0.50 | 2.00 | 2.00 | 0.20 | 2.00 | Er | 1.00 |
| 53* | 0.92 | 0.50 | 2.00 | 2.00 | 0.20 | 2.00 | Yb | 0.00 |
| 54* | 0.92 | 0.50 | 2.00 | 2.00 | 0.20 | 2.00 | Y | 0.00 |
| 55* | 0.92 | 0.50 | 2.00 | 2.00 | 0.20 | 4.00 | Ce | 0.00 |
| 56* | 0.92 | 0.50 | 2.00 | 2.00 | 0.20 | 4.00 | Pr | 0.00 |
| 57* | 0.92 | 0.50 | 2.00 | 2.00 | 0.20 | 4.00 | Nd | 0.00 |
| 58* | 0.92 | 0.50 | 2.00 | 2.00 | 0.20 | 4.00 | Sm | 0.00 |
| 59* | 0.92 | 0.50 | 2.00 | 2.00 | 0.20 | 4.00 | Eu | 0.00 |
| 60* | 0.92 | 0.50 | 2.00 | 2.00 | 0.20 | 4.00 | Gd | 0.00 |
| 61* | 0.92 | 0.50 | 2.00 | 2.00 | 0.20 | 4.00 | Dy | 0.00 |
| 62* | 0.92 | 0.50 | 2.00 | 2.00 | 0.20 | 4.00 | Ho | 0.00 |
| 63* | 0.92 | 0.50 | 2.00 | 2.00 | 0.20 | 4.00 | Er | 0.00 |

*Out of the ranges of the present invention

Next, the dielectric constant, the Q factor, the temperature coefficient, and the flexural strength were measured as in EXAMPLE 1.

Table 6 shows the results thereof.

TABLE 6

| Sample | Dielectric constant ∈ (-) | Q factor (-) | Temperature coefficient (ppm/° C.) | Firing Temperature (° C.) | Flexural strength (MPa) |
|---|---|---|---|---|---|
| 41 | 350 | 1360 | -1600 | 1250 | 140 |
| 42 | 350 | 1100 | -1650 | 1250 | 140 |
| 43 | 350 | 1100 | -1600 | 1250 | 140 |
| 44 | 350 | 1250 | -1700 | 1250 | 140 |
| 45 | 350 | 1250 | -1650 | 1250 | 140 |
| 46 | 350 | 1250 | -1600 | 1250 | 140 |
| 47 | 330 | 1270 | -1600 | 1250 | 140 |
| 48 | 340 | 1200 | -1650 | 1250 | 140 |
| 49 | 340 | 1130 | -1700 | 1250 | 140 |
| 50 | 370 | 1000 | -1350 | 1240 | 140 |
| 51 | 360 | 1100 | -1300 | 1240 | 140 |
| 52 | 350 | 1100 | -1200 | 1240 | 140 |
| 53* | 360 | 900 | -1800 | 1250 | 140 |

TABLE 6-continued

| Sample | Dielectric constant ∈ (−) | Q factor (−) | Temperature coefficient (ppm/° C.) | Firing Temperature (° C.) | Flexural strength (MPa) |
|---|---|---|---|---|---|
| 54* | 290 | 1370 | −1600 | 1250 | 140 |
| 55* | 280 | 2100 | −1100 | 1220 | 150 |
| 56* | 280 | 2100 | −1050 | 1220 | 150 |
| 57* | 290 | 2000 | −1300 | 1250 | 150 |
| 58* | 280 | 2100 | −1350 | 1250 | 150 |
| 59* | 270 | 2000 | −1050 | 1220 | 150 |
| 60* | 280 | 2200 | −1400 | 1250 | 150 |
| 61* | 260 | 2000 | −950 | 1220 | 150 |
| 62* | 280 | 2300 | −1450 | 1250 | 150 |
| 63* | 270 | 2000 | −1500 | 1250 | 150 |

*Out of the ranges of the present invention

As is evident from Tables 5 and 6, since Yb, which is out of the range of the present invention, is added in Sample 53, the Q factor is small at 900. In Sample 54, since Y, which is out of the range of the present invention, is added, the dielectric constant is low at 290, and it is not possible to obtain a ceramic electronic component with a high dielectric constant.

Although lanthanides of the present invention are added in Samples 55 to 63, since the $Ln_2O_3$ content is high at a weight z of 4.0, the dielectric constant is low at 260 to 290, and it is not possible to obtain a ceramic electronic component with a high dielectric constant.

In contrast, since Ce, Pr, Nd, Sm, Eu, Dy, Ho, or Er is used as Ln, and since the weight ratio z is set to be 2.00, the dielectric constant is 300 or more, the Q factor is 1,000 or more, and the temperature coefficient can be controlled within −2,000 ppm/° C. in Samples 41 to 52.

In particular, since $TiO_2$ in Samples 50 to 52 is added so that molar ratio p (=Ti/Ln) is 1.00, it is possible to obtain a dielectric ceramic with a higher dielectric constant compared to Samples 41, 46, and 49 in which $TiO_2$ is not incorporated.

EXAMPLE 4

$SiO_2$ was further added as a material for the secondary constituent, and the advantageous effect of $SiO_2$ was confirmed.

In addition to the composition of Sample 2 (shown in Table 1), $SiO_2$ was added so that the weight w to 100 parts by weight of the primary constituent was 0.50, and a single-layer capacitor of Sample 71 was fabricated as in EXAMPLE 1.

Furthermore, $TiO_2$ was added as a material for the secondary constituent so that the molar ratio p was 1.00 in addition to the materials for the primary constituent and the materials for the secondary constituent of Sample 71, and a single-layer capacitor of Sample 72 was fabricated as in EXAMPLE 1.

Next, SiO2 was added in the composition of Sample 5 (shown in Table 1) so that the weight w to 100 parts by weight of the primary constituent was 1.00, and a single-layer capacitor of Sample 73 was fabricated as in EXAMPLE 1.

Furthermore, $TiO_2$ was added as a material for the secondary constituent in the materials for the primary constituent and the materials for the secondary constituent of Sample 73 so that the molar ratio p was 1.00, and a single-layer capacitor of Sample 74 was fabricated as in EXAMPLE 1.

Table 7 shows the compositions of Samples 71 to 74.

TABLE 7

| Sample | a[($Sr_bCa_{1-b}$)$TiO_3$] − (1 − a)[$Bi_2O_3$·n$TiO_2$] | | | x$MgTiO_3$ + y$MnO_m$ + z$La_2O_3$ + w$SiO_2$ | | | | |
|---|---|---|---|---|---|---|---|---|
| | a | b | n | x | y | z | w | p |
| 71 | 0.90 | 0.45 | 2.00 | 2.00 | 0.20 | 2.00 | 0.50 | 0.00 |
| 72 | 0.90 | 0.45 | 2.00 | 2.00 | 0.20 | 2.00 | 0.50 | 1.00 |
| 73 | 0.88 | 0.35 | 2.00 | 2.00 | 1.50 | 3.00 | 1.00 | 0.00 |
| 74 | 0.88 | 0.35 | 2.00 | 2.00 | 1.50 | 3.00 | 1.00 | 1.00 |

Next, the dielectric constant, the Q factor, the temperature coefficient, and the flexural strength were measured as in EXAMPLE 1.

Table 8 shows the results thereof.

TABLE 8

| Sample | Dielectric constant ∈ (−) | Q factor (−) | Temperature coefficient (ppm/° C.) | Firing Temperature (° C.) | Flexural strength (MPa) |
|---|---|---|---|---|---|
| 71 | 355 | 1200 | −1500 | 1230 | 160 |
| 72 | 390 | 1000 | −1600 | 1220 | 150 |
| 73 | 330 | 1800 | −1350 | 1210 | 160 |
| 74 | 350 | 1600 | −1400 | 1200 | 160 |

As is evident from Tables 7 and 8, with Sample 71 in which the firing temperature is 1,230° C. and the flexural strength is 160 MPa, it is possible to decrease the firing temperature and to improve the flexural strength compared to Sample 2 (firing temperature: 1,240° C.; flexural strength: 140 MPa) in which $SiO_2$ is not incorporated.

With respect to Sample 73, in which the firing temperature is 1,210° C. and the flexural strength is 160 MPa, it is possible to decrease the firing temperature and to improve the flexural strength compared to Sample 5 (firing temperature: 1,230° C.; flexural strength: 150 MPa) in which $SiO_2$ is not incorporated.

(?) In Sample 72, in which $TiO_2$ is added so that the molar ratio p is 1.00, the dielectric constant is improved to 390 compared to Sample 71 (dielectric constant: 355) in which $TiO_2$ is not incorporated.

Since $TiO_2$ is added so that the molar ratio p is 1.00 with respect to Sample 74, the dielectric constant is improved to 350 compared to Sample 73 (dielectric constant: 330) in which $TiO_2$ is not incorporated.

What is claimed is:

1. A dielectric ceramic comprising:

a primary constituent represented by general formula (1):

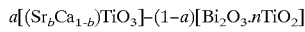

$$a[(Sr_bCa_{1-b})TiO_3]-(1-a)[Bi_2O_3 \cdot nTiO_2]$$

(wherein a and b indicate molar amounts, and n indicates a molar ratio of $TiO_2$ to $Bi_2O_3$); and a secondary constituent represented by general formula (2):

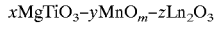

$$xMgTiO_3 - yMnO_m - zLn_2O_3$$

(wherein x, y, and z indicate weight amounts per 100 parts by weight of the primary constituent, m is 1 to 2, and Ln is at least one element selected from the group consisting of La, Ce, Pr, Nd, Sm, Eu, Gd, Dy, Ho and Er), and wherein a, b, n, x, y, and z satisfy the expressions $$0.88 \leq a \leq 0.92,$$

$$0.3 \leq b \leq 0.5,$$

$$1.8 \leq n \leq 3,$$

$$1 \leq x \leq 3,$$

$$0.1 \leq y \leq 2, \text{ and}$$

$$0 < z \leq 3.$$

2. A dielectric ceramic according to claim 1, wherein the secondary constituent further comprises $TiO_2$, and the $TiO_2$ content is such as to satisfy the expression $0<p\leq 1.5$, wherein p is the molar ratio of the element Ti to the element Ln in the secondary constituent.

3. A dielectric ceramic according to claim 2, wherein p is 0.5 to 1.5.

4. A dielectric ceramic according to claim 3, wherein the secondary constituent further comprises $SiO_2$, and the $SiO_2$ content is such as to satisfy the expression $0<w\leq 1$, wherein w is the weight of $SiO_2$ per 100 parts by weight of the primary constituent.

5. A dielectric ceramic according to claim 4, wherein w is 0.5 to 1.

6. A dielectric ceramic according to claim 5, wherein Ln is La.

7. A dielectric ceramic according to claim 6, wherein b is 0.45 to 0.5, x is 1 to 2.5, y is 0.2 to 2 and z is 0.2 to 2.

8. A dielectric ceramic according to claim 1, wherein the secondary constituent further comprises $SiO_2$, and the $SiO_2$ content is such as to satisfy the expression $0<w\leq 1$, wherein w is the weight of $SiO_2$ per 100 parts by weight of the primary constituent.

9. A dielectric ceramic according to claim 8, wherein w is 0.5 to 1.

10. A dielectric ceramic according to claim 1, wherein Ln is La.

11. A dielectric ceramic according to claim 1, wherein b is 0.45 to 0.5, x is 1 to 2.5, y is 0.2 to 2 and z is 0.2 to 2.

12. A ceramic electronic component comprising:
an object comprising a dielectric ceramic according to claim 10; and
electrodes disposed on the surfaces of the object.

13. A ceramic electronic component comprising:
an object comprising a dielectric ceramic according to claim 8; and
electrodes disposed on the surfaces of the object.

14. A ceramic electronic component comprising:
an object comprising a dielectric ceramic according to claim 7; and
electrodes disposed on the surfaces of the object.

15. A ceramic electronic component comprising:
an object comprising a dielectric ceramic according to claim 6; and
electrodes disposed on the surfaces of the object.

16. A ceramic electronic component comprising:
an object comprising a dielectric ceramic according to claim 5; and
electrodes disposed on the surfaces of the object.

17. A ceramic electronic component comprising:
an object comprising a dielectric ceramic according to claim 4; and
electrodes disposed on the surfaces of the object.

18. A ceramic electronic component comprising:
an object comprising a dielectric ceramic according to claim 3; and
electrodes disposed on the surfaces of the object.

19. A ceramic electronic component comprising:
an object comprising a dielectric ceramic according to claim 2; and
electrodes disposed on the surfaces of the object.

20. A ceramic electronic component comprising:
an object comprising a dielectric ceramic according to claim 1; and
electrodes disposed on the surfaces of the object.

* * * * *